United States Patent

[11] 3,608,598

| [72] | Inventors | Joe R. Urschel<br>202 Michigan Ave.;<br>Edgar R. Sanders, 708 Evan Ave., both of<br>Valparaiso, Ind. 46383 |
|---|---|---|
| [21] | Appl. No. | 839,281 |
| [22] | Filed | July 7, 1969 |
| [23] | | Division of Ser. No. 512,716, Dec. 9, 1965 |
| [45] | Patented | Sept. 28, 1971 |

[54] APPARATUS AND METHOD FOR CONDITIONING A PRODUCT
14 Claims, 6 Drawing Figs.

[52] U.S. Cl. ................................................. 146/225,
146/79, 241/30, 241/152, 241/261
[51] Int. Cl. ..................................................... B02b 5/00,
B02b 7/00, B02c 17/00

[50] Field of Search .......................................... 241/13, 6,
30, 29, 152, 152 A, 257, 260, 261, 275; 146/79,
225, 239, 192

[56] References Cited
UNITED STATES PATENTS

| 2,167,214 | 7/1939 | Lasch et al. ................ | 241/162 |
|---|---|---|---|
| 569,238 | 10/1896 | Sauerbrey ................... | 241/152 |
| 3,251,557 | 5/1966 | Urschel et al. .............. | 241/5 |

FOREIGN PATENTS

| 1,014,764 | 6/1952 | France ........................ | 241/260 |

Primary Examiner—James L. Jones, Jr.
Attorney—Charles S. Penfold

ABSTRACT: The invention primarily involves forcing a product centrifugally through tortuous passages for varying the viscosity of the product.

PATENTED SEP 28 1971 3,608,598
SHEET 1 OF 2
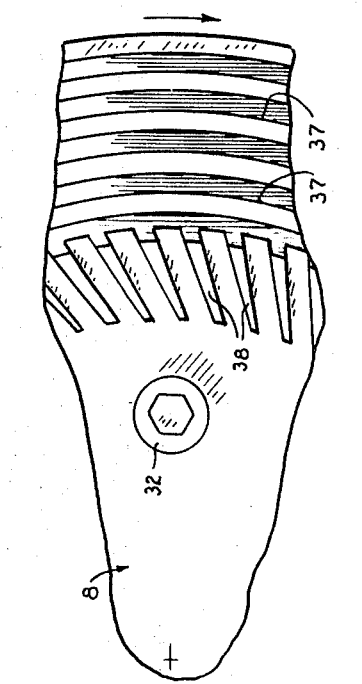
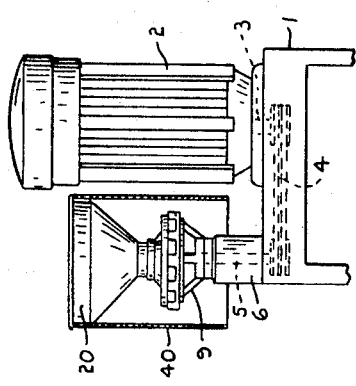
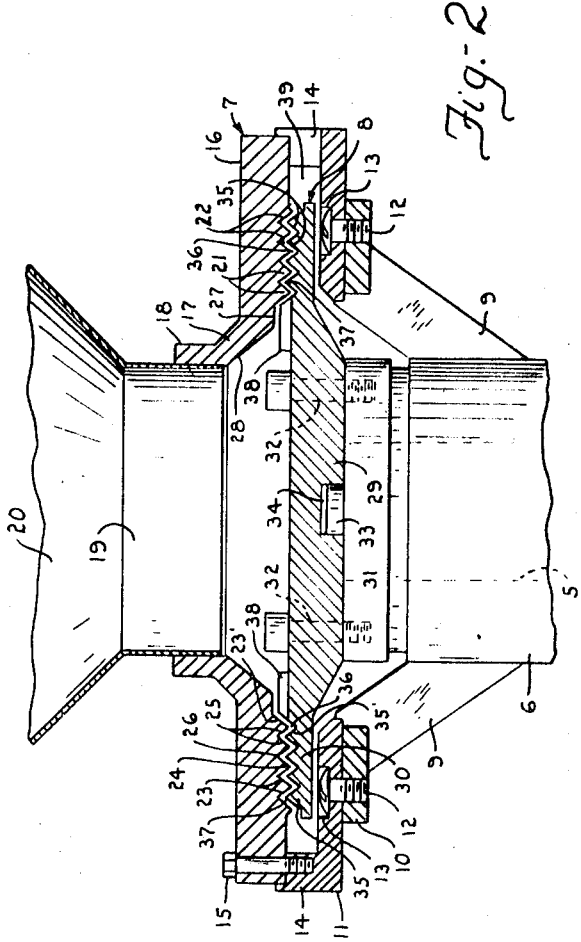
INVENTOR.
JOE R. URSCHEL
EDGAR R. SANDERS
Charles S. Penfold
ATTORNEY PATENTED SEP 28 1971 3,608,598
SHEET 2 OF 2
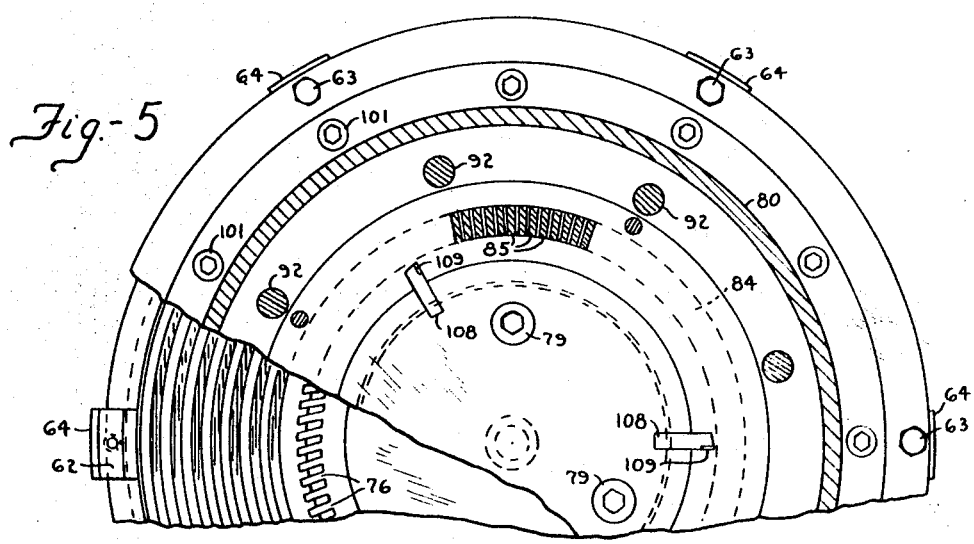
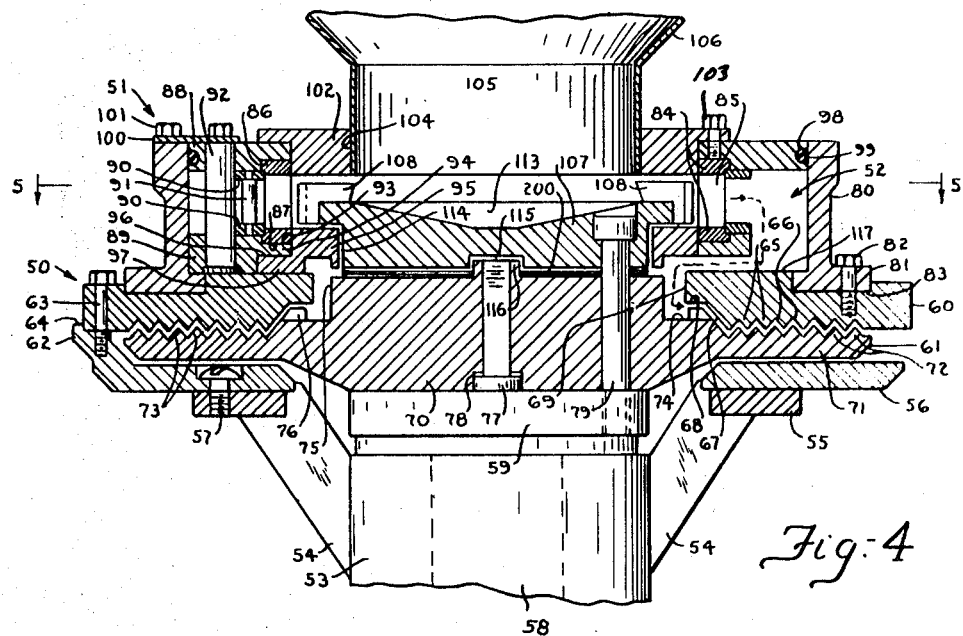
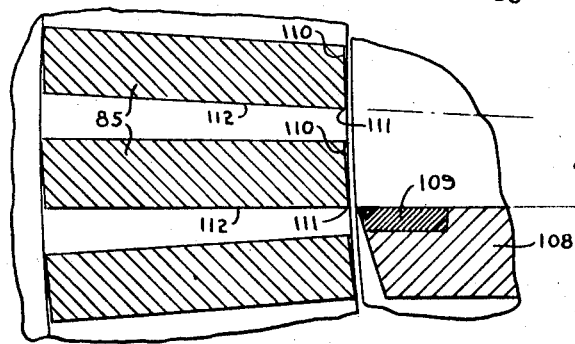
INVENTOR.
JOE R. URSCHEL
EDGAR R. SANDERS
ATTORNEY

APPARATUS AND METHOD FOR CONDITIONING A PRODUCT

The subject application is a division of my application Ser. No. 512,716 filed Dec. 9, 1965.

The subject invention relates generally to means for conditioning a product and more specifically has to do with apparatus and a method whereby the structure of a food product is modified.

An important objective of the invention is to provide a machine and method whereby a product is rotated at a high rate of speed and under the influence of tremendous or great pressure through a tortuous passage in a manner whereby to work, roll and/or disintegrate a product or mass in a manner whereby to promote fineness of texture and a reduction in the viscosity of the resultant product.

More significantly, an object of the invention is to provide a machine or unit which, among other things, comprises a pair of relatively rotatable members having opposed areas provided with annular ribs and grooves which are generally arranged in a mating or nesting relationship so as to provide what may be termed a restricted, undulating or generally zigzag tortuous passage or passages.

Another object of the invention is to provide a machine of the character above referred to in which one of the members is stationary and the other is rotatable and the rotatable member is preferably provided with an appreciable number of circumferentially spaced generally chordally disposed abutments or blades which assist in distributing or feeding the product to the tortuous passage or passages.

Also, an object of the invention is to provide a machine of the above character, in which the rotatable member is further preferably provided with means adjacent its center which serves to direct the product initially received thereon toward the circumferentially spaced abutment means or blades.

A specific object of the invention is to provide means whereby the space between the relatively movable members or the size of the tortuous passage or passages through which the product is forced may be varied as desired.

Another important object of the invention is to provide an assembly which comprises the machine or unit above described and an additional unit or structure, which units are operatively associated or connected in such a manner that the additional unit serves to condition the product before it is subjected to the influence of the former. Otherwise expressed, the product is successively subjected to or worked upon by two units which are operable in conjunction with one another whereby to progressively reduce the size, state or condition of a product.

Also, an object of the invention is to provide a setup whereby the units above referred to may be utilized separately.

Of further significance is the fact that the invention offers a unique organization or method whereby a product, such as peanuts, may be subjected to a multiplicity of actions for reducing its size to obtain a flowable mass and varying the viscosity and texture of the mass whereby to improve its usefulness.

A specific, but important, objective of the invention is to provide an assembly comprising a pair of machines or units which are operatively connected in such a manner that a component of one unit may be axially adjusted without changing the axial position of a movable component of the other unit.

The invention also offers advantages with respect to its great productive capacity, operation, efficiency, assembly and durability.

Additional objects and advantages of the invention will become apparent after the description hereinafter set forth is considered in conjunction with the drawings annexed hereto.

In the drawings:

FIG. 1 is an elevational side view of an assembly or apparatus for achieving at least one of the objectives above set forth;

FIG. 2 is an enlarged vertical section of a machine constituting a component of the assembly shown in FIG. 1;

FIG. 3 is a partial enlarged horizontal view of a rotatable member of the structure shown in FIG. 2;

FIG. 4 is a vertical section taken through a modified assembly or structure;

FIG. 5 is a horizontal section taken substantially on line 5—5 of FIG. 4 with portions broken away to illustrate details of construction; and FIG. 6 is an enlarged horizontal partial view of a part of one of the units illustrated in FIG. 4.

Attention is directed to the fact that the structure exemplified in FIG. 2 constitutes am improvement over the subject matter disclosed in an application, Ser. No. 337,247, filed on Jan. 13, 1964, in the name of Joe R. Urschel.

Referring first to the structure illustrated in FIGS. 1 through 3 of the drawing, there is shown in FIG. 1 a table 1 which supports a motor 2 having a drive shaft 3 which is preferably connected by V-belts 4 to a driven shaft 5 mounted in a cylindrical bearing 6.

Referring more particularly to FIG. 2, the machine or unit disclosed therein preferably comprises, among other things, a pair of members respectively generally designated 7 and 8, the former of which is preferably stationary and the latter preferably rotatable. The bearing 6 is preferably provided with a plurality of angularly disposed arms 9 which carry an annular support 10. An annular mounting or ring 11 is preferably detachably secured to the support 10 by a plurality of fastening means or screws 12. The upper surface of the mounting is provided with recesses 13 for receiving the heads of the screws.

The mounting 11 is preferably provided with a plurality of circumferentially spaced upstanding internally threaded lugs 14 and the stationary member 7 is preferably detachably secured to the lugs by a plurality of circumferentially spaced screws 15 which extend through the member and connect with the threads provided in the lugs so that the member is firmly secured in axially spaced relation with respect to the mounting and to the rotatable member 8. The lugs serve as spacers and the circumferentially areas therebetween constitute discharge passages through which the product is discharged laterally from the machine.

The stationary member or stator 7 may be designed and constructed in various ways but, as illustrated, preferably includes an outer substantially planar annular portion 16, and an inner generally tapered cylindrical portion 17 provided with an axially extending cylindrical continuation or portion 18. The portion 18 preferably receives a reduced cylindrical portion 19 of a funnellike hopper 20 which accommodates the product to be conditioned. The underside of the stationary member is preferably provided with a plurality of four substantially corresponding annular ribs 21 and annular grooves 22. More specifically in this respect, each of the ribs is preferably defined by a pair of converging surfaces 23 which define a point 24 and each of the grooves is preferably defined by a pair of converging surfaces 25 which intersect at a point 26. It will be observed that the ribs and grooves are substantially V-shaped. The converging surfaces defining the ribs and the converging surfaces defining the grooves are preferably disposed at an acute angle of approximately 80°. Otherwise expressed, the stationary member is provided with a plurality of ribs and grooves, corrugations or wavelike formations which are generally arranged in a zigzag relationship at a location preferably inset from the peripheral edge of the member. The stationary member is also preferably provided with an internal annular surface 27 which is located between and adjacent the innermost of the ribs and a tapered cylindrical surface 28 formed by the cylindrical portion 17 of the member. The surfaces 27 and 28 and innermost converging surface 23 of the innermost rib define what may be termed an inner chamber or area which receives the product from the hopper and facilitates its flow laterally between the members 7 and 8.

The rotatable member or rotor 8 is preferably in the form of an annular plate having a relatively thick central portion 29 and an outer annular portion 30 having a reduced thickness. The annular portion 30 is axially spaced between the stationary member 7 and the mounting 11. The central portion is preferably secured to a head 31 carried by the driven shaft 5 by a plurality of screws 32 which extend through holes provided therefore in the member and threadedly connect with the head. It is important to note that the heads of the screws constitute abutments, the purpose of which will be described subsequently. The head 31 is preferably provided with a boss 33 which is received in a centrally disposed recess 34 provided in the underside of the member 8 whereby to facilitate centering and stabilization of this member on the head.

The upper surface of the outer annular portion 30 of the rotatable member 8 is preferably provided with a plurality of four corresponding ribs 35 and grooves 36 which are of a character generally corresponding to the ribs 21 and grooves 22 provided in the stationary member 7. The ribs and grooves of the rotatable member are preferably arranged in a nesting relationship with the ribs and grooves provided on the member 7 so as to provide zigzag passages or a tortuous, zigzag or undulating passage between the members 7 and 8. In other words, the members are provided with cooperating means forming a plurality of articulated interconnected passages which define a larger or primary passage or path through which the product flows or travels. It is to be observed that the ribs on the rotatable member 8 are provided with points 37 which are disposed at a higher elevation than the points 24 provided on the ribs of the stationary member 7. It is important that the points are arranged as just stated so that the product, in flowing outwardly between the members, will be subjected to or worked upon by the plural surfaces defining the ribs and grooves.

The rotatable member 8 is also preferably provided with circumferentially spaced generally chordally disposed abutments or impeller blades 38. These blades are of variable cross-sectional dimension and gradually increase in width in a direction outwardly with reference to the axis of the rotatable member. The blades may be formed as integral portions of the rotatable member or may be in the form of inserts or elements which may be welded to the member.

It should be noted that the outermost extremities of the blades are preferably provided with bevelled surfaces which constitute continuations of the innermost converging surface of the innermost groove provided in the rotatable member. The rotatable member is preferably provided with a multitude of blades, the purpose of which is to facilitate uniform distribution of the product to the conditioning zone formed by the ribs and grooves in the members 7 and 8. The chordal arrangement or nonradial angle of the blades serves to accelerate entrance or otherwise promote the flow of the product to the passage or conditioning zone. The blades are preferably arranged in the chordal relationship illustrated but, if desired, they may be disposed in radial positions.

It is to be understood that, although the heads of the screws 32 constitute abutment means which assist in initially imparting rotation and distribution of the product to the blades, means other than these screws may be employed to secure the rotatable member to the head 31 and impart rotation to the product. For example, the rotatable member may be welded to the head of the shaft and provided adjacent its center with corresponding spaced abutments in the form of vanes, integral upstanding projections or ribs. Also, if found desirable, the member 8 may be constructed with the upper surface of the central portion 29 being substantially unobstructed so that the product may fall through the funnel onto a relatively smooth central area on the rotatable member for centrifugal flow between the impeller blades.

As above referred to, the heads of the screws 32 provide abutments and these abutments engage or strike the product to initially rotate it for outward movement by centrifugal force where it is picked up by the impeller blades 38 which serve to bring the product to the full rotational speed of the rotational member and direct or otherwise throw the product with tremendous force against an innermost stationary converging impact surface 23' of the innermost rib provided on the stationary member 7. The surface 23' offers frictional resistance or a rubbing action of the product thereagainst and tends to reduce the rotational speed of the product. The rotational speed of the product is such that centrifugal force also causes the product to be next thrown or directed against an innermost surface 35' of the innermost rib 35 on the rotatable member and this increases the rotational speed of the product to cause it to rub or otherwise intimately engage this surface. The centrifugal force is also sufficient to cause the product to be thrown or directed against the innermost converging surface 23 on the next adjacent rib of the member 7 and so on throughout the radial and circumferential extent of the passage, area or conditioning zone defined by the ribs and grooves.

Attention is directed to the fact that the product, upon falling onto the rotatable member initially flows substantially in a horizontal plane between the impeller blades and the upper planar surface of the rotatable member and the opposed parallel annular surface 27 after which it successively flows downwardly and upwardly until it is discharged in a downward direction from between the members into an annular space or chamber 39 for final discharge horizontally in the areas between the lugs 14.

If desired, an apron, shroud or jacket 40 may be supported on the funnel or mounted in any other suitable manner about the members 7 and 8 whereby to generally direct any outflowing mass of the resultant product downwardly into a container, not shown, for the use intended.

It is to be understood that the number of the ribs and grooves may be varied and that although the spacing between the members 7 and 8 is predetermined, this spacing is not particularly critical except that it is desirable that the upwardly directed points 37 of the ribs 35 on the rotatable member be higher than the downwardly directed points 24 of the ribs 21 on the stationary member.

Attention is directed to the fact that the material flowing over the articulated surfaces defining the passages is accomplished by a very high rotational speed of the rotatable member or rotor 8. For example, when the machine is utilized in the manufacture of peanut butter, the outer annular portion 30 of the rotatable member 8 travels at a linear speed of 26,225 feet per minute and this speed is sufficient to produce a centrifugal force sufficient to cause the product to flow outwardly at 13,600 times its weight.

Referring now to the structures exemplified in FIGS. 4, 5 and 6, there is illustrated a first machine or unit generally designated 50 which generally embodies the principles of design and construction of the machine or unit illustrated in FIGS. 2 and 3 above described and a second machine or unit generally designated 51 which receives and conditions a product, such as peanuts, for transmission to the unit 50 through a conductor means generally designated 52. The machine or units 50 and 51 may be operated or driven by a motor and V-belts in a way generally corresponding to that illustrated in FIG. 1 of the drawing.

Referring now more particularly to the unit 50, numeral 53 represents a tubular bearing having inclined arms 54 which carry a stationary annular support 55. A stationary annular mounting or ring 56 is preferably detachably connected to the annular support by fastening means, such as screws 57. A driven shaft 58 is journaled in the bearing and provided with a head 59. The machine 50 also includes a pair of members 60 and 61, the former of which is stationary and the latter of which is rotatable.

The stationary member 60 is annular and preferably detachably connected to circumferentially spaced integral lugs 62 on the mounting by fastening means, such as the screws 63. The generally arcuate spaces between the lugs provide discharge areas for the resultant product. It will be observed that the lugs are provided with: planar surfaces upon which the stationary member rests; tapped holes which receive the screws; and upstanding lips 64 which assist in holding the stationary member in place. The undersurface of the stationary member is provided with means preferably in the form of a plurality of seven annular downwardly pointed ribs 65 and with annular grooves 66, including an inclined surface 67 constituting a continuation of the innermost surface of the innermost rib, an adjacent horizontal annular surface 68, and an inner vertical annular surface 69.

The rotatable member or rotor 61 preferably includes a relatively thick central portion 70 and an outer radial circumferential portion 71 of a reduced thickness. The upper surface of the outer portion is provided with means preferably in the form of a plurality of seven annular upwardly pointed ribs 72 and with grooves 73. It is thus apparent that opposed surfaces of the stationary and rotatable members 60 and 61 are provided with ribs and grooves which are arranged in a cooperating or mating relationship in a manner similar to the ribs and grooves above referred to so as to provide a plurality of interconnected articulated passages which define a radially and circumferentially extending passageway for the purpose of modifying the structural characteristics of the product.

The outer reduced portion 61 of the rotor is also preferably provided with an upper planar horizontal surface 74 and an adjacent vertical surface 75. The portion 61 is preferably provided with a plurality of circumferentially spaced abutments or blades 76 which generally correspond to the blades 38 described above. The surfaces 68 and 69 of the stationary member and the surfaces 74 and 75 of the rotor define what may be referred to as an L-shaped passage or aperture of the conducting means 52.

The head 59 of the driven shaft 58 is preferably provided with a centrally disposed boss 77 and is received in a central recess 78 provided in the underside of the rotatable member 61 whereby to assist in locating and centering the member on the head. The member 61 is preferably detachably connected to the head by means of a plurality of screws 79 which extend through holes provided in the member and threadedly connect with tapped holes provided in the head.

Referring now more particularly to the machine or unit 51 it may, for example, be generally of either of the two types illustrated in our copending application, Ser. No. 397,137, now Pat. No. 3,251,389. More particularly, the unit includes, among other things, an annular wall or ring 80 which is disposed about a cutter or conditioning structure. The wall is preferably provided with a lower annular enlargement 81 and preferably detachably secured by screws 82 in an annular recess 83 provided therefor in an upper surface of the stationary member 60 of the unit 50. The cutter or conditioning structure of the unit 51 includes a pair of annular rings 84 supporting a plurality of axially extending circumferentially spaced elements or blades 85. The rings 84 are preferably respectively seated in annular recesses 86 and 87 respectively provided in a pair of annular supports 88 and 89. A pair of annular members 90 are disposed in surrounding relationship with respect to the elements 85 and are axially spaced apart by spacers 91. The spacers are preferably cylindrical and have reduced ends or pintles which extend into holes provided therefor in the annular members 90. The annular members engage the upper and lower ends of the elements in a manner whereby to serve as abutments therefor.

The annular supports 88 and 89 are preferably secured together by a plurality of circumferentially spaced bolts 92 which, in turn, hold the rings 90, elements 85, and spacers 91, clamped between the supports. The lower support 89 is preferably provided with an annular recess 93 which receives the lowermost of the pair of ring members 84 and with an annular recess 96 which receives a portion 97 of a fixed annular member 95. The member 95 is provided with an annular recess 96 which receives a portion 94 of the member 89 and the lowermost ring 84. This organization provides a positive interlocking relationship between the components whereby to promote stability.

The upper support 88 is preferably provided with an external annular recess 98 which receives an O-ring 99 adapted to engage an internal surface of the wall 80 so as to provide a sealed connection therebetween. In order to further insure a tight connection between the upper support and the wall and assist in connecting the conditioning structure and the wall, a plurality of strips 100 (one shown) are preferably secured in overlapping relationship to the wall and support by means of the bolts 92 and a plurality of circumferentially spaced screws 101.

A ring 102 is preferably detachably connected to the upper support 88 by a plurality of circumferentially spaced screws 103 and this ring has portions which extend into and in overlapping relation with respect to the support and into engagement with an inner surface of the upper ring 84 and is provided with a central aperture 104 which preferably receives a reduced cylindrical portion 105 of a hopper 106.

An impeller structure having a member 107 is preferably detachably connected to the rotor 61 and to the head 59 of the shaft 58 by the screws 79, above referred to. In other words, the screws 79 serve the dual function of operatively connecting the members 61 and 107 and these members to the head 59 of the shaft. The member 107 is provided with a plurality of circumferentially spaced impeller abutments or blades 108 and due to the fact that this member and the rotor 61 are respectively provided with impeller blades, these members may each be referred to as impeller means.

The blades 108 are preferably generally L-shaped and include a horizontal portion and also a vertical portion which is recessed and provided with hardened elements 109 having sharpened edges. The blades are preferably welded or anchored in place and the edges of the elements are preferably equally spaced apart circumferentially and disposed the same radial distances from the center of the member 107 so that the edges will be disposed at an appropriate running clearance with inner surfaces 110 and edges 111 of the circumferentially spaced elements 85, as shown in FIG. 6. The blades 108 on the member 107 are also provided with radial surfaces. The outer surfaces of these blades and conditioning elements 109 are provided with suitable rake angles and the elements 85 have radial or lateral surfaces 112 over which the conditioned product travels through circumferentially spaced discharge areas defined by adjacent surfaces of the blades 85.

Attention is directed to the fact that the upper surface of the member 107 is preferably dished as indicated at 113, that its periphery is preferably formed to provide an annular recess 114 which receives an inner portion of the fixed member 95 so as to more fully insure that the product falling or conducted onto the upper surface of the member 107 will be subjected to the elements 85. It will be noted that the underside of the member 107 is also provided with a center recess 115 which accommodates a center boss 116 provided on the rotor 61.

It is to be observed that the conducting means or annular chamber 52, above referred to, is defined by internal surfaces of the wall 80, upper and lower members 88 and 89, rings 90, elements 85 and an upper surface 117 of the stationary member 60. Also, the upper surface 117 of the member 60, lower surfaces of the lower support 89, fixed member 95, opposed surfaces 69 and 75 and 68 and 74 of the members 60 and 61 define what may be termed a generally U-shaped passage, which passage generally constitutes a part of or a continuation of the conducting means 52 so that the product will flow generally in the direction indicated by the arrow depicted in FIG. 4 for transmission to the rib and groove means or articulated surfaces provided on the relatively movable members 60 and 61.

As noted above, a significant objective of the invention is to provide means whereby the axial spacing between the ribs and grooves in the members 60 and 61 may be varied. With this in mind, attention is directed to the fact that FIG. 4 shows one way of achieving this adjustment by utilizing one or more shims 200 which are shown as being disposed between the rotatable members 61 and 107, but if desired, one or more of these shims may be interposed between the rotor member 61 and the head 59, so that the spacing between the members 60 and 61 may be variably decreased. This arrangement has the distinct advantage that by such an adjustment, the space between the members 60 and 61 may be varied without altering the position of the member 107 with respect to the conditioning structure comprising the circumferentially spaced elements 85.

In view of the foregoing, it should be manifest that the invention contemplates utilizing a machine and method as substantially exemplified in FIGS. 1 through 3 of the drawing and that, if so desired, a plurality of operatively connected machines or units may be employed whereby to successively condition a product in different ways for the purpose of modifying its structure.

Further, it should be manifest that the machine exemplified, for example, in FIG. 2 of the drawing and the machine generally designated 50 in FIG. 4 provide a unique organization whereby a product is subjected to considerable centrifugal force for directing it with tremendous force successively against what might be termed radially spaced articulated stationary and rotatable annular surfaces. Otherwise expressed, the product, through variable centrifugal forces, is successively directed against a plurality of annular inclined stationary surfaces and a plurality of inclined annular rotatable surfaces in a manner whereby to cause the product to flow through a tortuous passage for treatment to modify its structure.

Having thus described our invention, it is obvious that various modifications may be made in the same without departing from the spirit of the invention and, therefore, we do not wish to be understood as limiting ourselves to the exact forms, constructions, arrangements, and combinations of parts herein shown and described.

We claim:

1. In combination: a first means comprising a plurality of circumferentially spaced elements for conditioning a product, a second means comprising a plurality of annular articulated surfaces, impeller means adapted for connection with shaft means for rotation thereby, said impeller means having blades for directing a product against said elements and through the spaces therebetween and provided with a plurality of annular articulated surfaces disposed in a generally zigzag relationship to said first-mentioned articulated surfaces, means for receiving and conducting the conditioned product from said elements to said articulated surfaces, and additional means provided on said impeller means for directing the conditioned product outwardly between said articulated surfaces for additional conditioning.

2. The combination defined in claim 1, in which said receiving and conducting means comprises an annular chamber surrounding said elements and a substantially U-shaped continuation leading to said articulated surfaces.

3. A method of conditioning a product which comprises directing by centrifugal force a product against and between a plurality of circumferentially spaced abutments and then radially outward between a plurality of closely spaced substantially corresponding relatively rotatable annular articulated smooth surfaces for frictional treatment thereby for varying its viscosity.

4. A method of conditioning a food product which comprises rotating and forcing the product against and between a plurality of circumferentially spaced abutments and then radially outward through a restricted passage defined by normally stationary annular articulated smooth surfaces and annular articulated smooth surfaces provided on a rotatable member for frictional treatment by such surfaces for varying its viscosity.

5. A method of conditioning a product which comprises centrifugally forcing the product against and between a plurality of circumferentially spaced abutments and then radially outward between a plurality of opposed relatively rotatable annular articulated smooth surfaces which are disposed substantially in a zigzag corresponding relationship whereby to vary its viscosity.

6. A method of conditioning a product which comprises rotating the product against and radially outward between a plurality of circumferentially spaced abutments to reduce its size, conveying and forcing the reduced product outwardly through an annular zigzag passage defined by corresponding smooth ribs and grooves provided on a pair of opposed relatively rotatable members to produce a relatively thin fluid mass.

7. In combination: an upper conditioner and a lower conditioner unit supported directly below and in axial alignment with said upper unit, said upper unit comprising a plurality of circumferentially spaced abutments and an impeller for directing a product against and outwardly between said abutments for comminuting the product, said lower unit comprising a pair of members respectively provided with a plurality of annular articulated smooth surfaces defining a tortuous annular passage, an annular chamber surrounding said upper unit and connected with said annular passage, and means connecting said impeller and one of said members for rotating the same whereby the impeller also causes the comminuted product to flow through said annular chamber to said annular passage and said rotatable member assists in directing the product through said passage for treatment by said surfaces for modifying its structural characteristics.

8. The combination defined in claim 7, including means whereby said impeller and said rotatable member may be axially adjusted for varying the axial dimension of said tortuous passage.

9. In combination: a lower conditioner unit and an upper conditioner unit supported on and in axial alignment with said lower unit, said lower unit comprising a pair of members respectively provided with annular articulated corresponding mating smooth surfaces defining a zigzag annular passage, said upper unit comprising a plurality of circumferentially spaced abutments and an impeller, an annular chamber surrounding said upper unit connected with said annular passage, and means connecting said impeller and one of said members for rotating the same whereby the impeller directs the product against and outwardly between the abutments for comminuting the product and flow through said annular chamber to said annular passage and said rotatable member assists in directing the product successively against the surfaces of said passage for varying its viscosity.

10. In combination: a lower conditioner unit and an upper conditioner unit superimposed in axial alignment with said lower unit, said lower unit comprising a pair of members respectively provided with annular articulated corresponding mating smooth surfaces defining an annular zigzag passage, said upper unit comprising a plurality of circumferentially spaced abutments and an impeller, structure providing an annular chamber surrounding said upper unit and a substantially U-shaped passage communicatively connecting said annular chamber with said zigzag passage, means connecting said impeller and one of said members for simultaneous rotation whereby the impeller directs the product against and outwardly between the abutments for comminuting the product and flow through said annular chamber and said U-shaped passage to said zigzag passage, and means on said rotatable member which assists in directing the product successively against the surfaces of said zigzag passage for varying its viscosity.

11. The combination defined in claim 10, in which said spaced abutments and the other of said pair of members are stationary and said means on said rotatable member is disposed in a portion of said substantially U-shaped passage.

12. The combination defined in claim 10, in which the other of said pair of members is stationarily supported between said annular chamber and said rotatable members assists in defining said substantially U-shaped passage.

13. The combination defined in claim 1, in which said impeller means comprises a member which carries the blades and a member which is provided with the articulated surfaces, including means interposed between the members whereby they may be axially adjusted with respect to one another.

14. The combination defined in claim 1, including shaft means for imparting rotation to said impeller means, said impeller means comprises a member which carries the blades and a member which is provided with the articulated surfaces, including means connecting said members together and to said shaft means, and means interposed between said members whereby the same may be axially adjusted.